B. M. MATHIAS.
SHOCK ABSORBING MOUNTING.
APPLICATION FILED JULY 26, 1917.
1,292,841.
Patented Jan. 28, 1919.
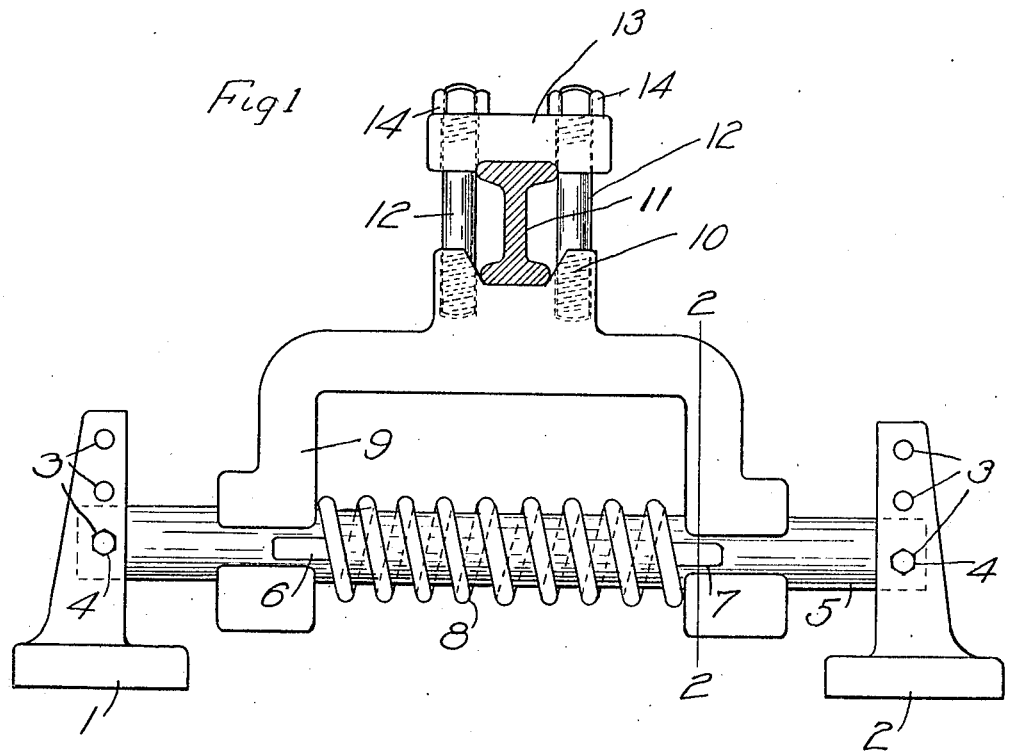
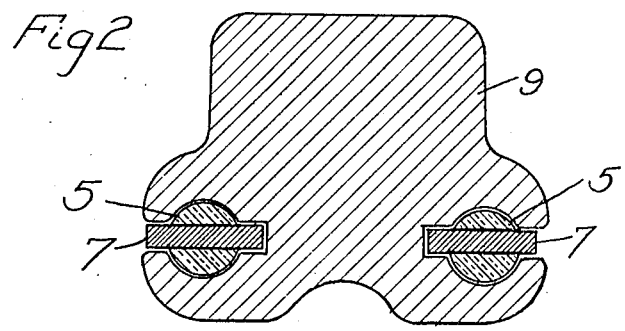
Inventor:
Berton M Mathias
by C.D. Enochs
Attorney

UNITED STATES PATENT OFFICE.

BERTON M. MATHIAS, OF MINNEAPOLIS, MINNESOTA.

SHOCK-ABSORBING MOUNTING.

1,292,841.

Specification of Letters Patent.  Patented Jan. 28, 1919.

Application filed July 26, 1917. Serial No. 183,010.

*To all whom it may concern:*

Be it known that I, BERTON M. MATHIAS, a citizen of the United States, and a resident of Minneapolis, in the county of Hennepin and State of Minnesota, have invented certain new and useful Improvements in Shock-Absorbing Mountings, of which the following is a specification.

One object of my invention is to provide in a mounting, means for absorbing shocks that might cause damage to the article carried by the mounting.

Another object of my invention is to provide in a mounting means for attachment to a floor, means for mounting an automobile, and shock absorbing means interposed between the two first mentioned means.

Another object of my invention is to provide adjustable features for a device of the class described.

With these and incidental objects in view the invention consists of certain novel features of construction and combination of parts, the essential elements of which are hereinafter described with reference to the drawing which accompanies and forms a part of this specification.

In the drawing Figure 1 is a side elevation of my improved shock absorbing mounting as used for supporting an automobile, and Fig. 2 is a section taken on the line 2—2, Fig. 1.

In the preferred form for automobile mounting I provide a pair of brackets 1 and 2, Fig. 1, having apertures 3 for passing therethrough bolts 4 to support a pair of round bars 5.

A pair of keys 6 and 7 in each of the bars 5, carry therebetween a spring 8.

A yoke 9, slidably mounted on the bars 5, engages with the spring 8 at either end so that a transverse motion of the yoke in either direction will tend to compress the spring 8.

Where the mounting is used to support an automobile on its axle the upper part of the yoke is fashioned at 10 to receive the axle 11 of the automobile to be supported, and studs 12 with a yoke 13, serve to clamp the axle to the yoke 9 by tightening up the nuts 14.

This device is particularly adapted to be used in connection with the construction shown in my Patent No. 1,219,832, issued March 20, 1917, for freight car wall construction, and also with the construction shown in my allowed application, Serial No. 176,625, dated June 15, 1917, freight car floor construction, and allowed July 10, 1917.

When used to support an automobile through its wheels the part 10 of the yoke 9 would, of course, be fashioned to receive the wheels somewhat in the manner described in my patent aforesaid, and the extremely advantageous feature can be readily understood when the application of the present device is considered in connection with the upper deck of a freight car wall construction such as described in my patent aforesaid, as this shock absorbing mounting will not only relieve the automobile itself of severe shocks, due to the sudden stopping and starting of the freight car in which it is being transported, but will also relieve the upper deck of the strains thrown on it by the inertia of the automobile.

While I have described my invention and illustrated it in one particular design, I do not wish it understood that I limit myself to this construction, as it is evident that the application of my invention may be varied in many ways within the scope of the following claims:

1. In a shock absorbing mounting the combination of a pair of mounting brackets, a bar connecting said brackets, a mounting yoke slidably carried by said bar, and shock absorbing means interposed between said yoke and said bar.

2. In a shock absorbing mounting the combination of a pair of mounting brackets, two bars connecting said mounting brackets, a mounting yoke slidably mounted on said bars, a spring carried by each of said bars, a pair of keys passing through each of said bars to position said springs thereon, said springs being positioned within the fork of said yoke.

BERTON M. MATHIAS.

Copies of this patent may be obtained for five cents each, by addressing the "Commissioner of Patents, Washington, D. C."